United States Patent
Mallebrein

(10) Patent No.: US 6,247,457 B1
(45) Date of Patent: Jun. 19, 2001

(54) METHOD FOR OPERATING AN INTERNAL COMBUSTION ENGINE

(75) Inventor: Georg Mallebrein, Korntal-Münchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/345,411

(22) Filed: Jul. 1, 1999

(30) Foreign Application Priority Data

Jul. 7, 1998 (DE) ............................................. 198 30 300

(51) Int. Cl.⁷ ........................... F02M 25/07; G01M 19/00
(52) U.S. Cl. ............... 123/520; 123/568.14; 123/568.21; 73/117.3; 701/108
(58) Field of Search ........................ 123/568.14, 568.19, 123/568.21, 568.2, 568.18, 568.22, 568.23, 520; 701/108; 73/117.3, 118.2

(56) References Cited

U.S. PATENT DOCUMENTS

| 4,242,728 | * | 12/1980 | Hartford | 123/568.21 |
|---|---|---|---|---|
| 4,279,235 | * | 7/1981 | Flaig et al. | 123/568.21 |
| 4,401,081 | | 8/1983 | Wessel et al. | |
| 4,548,185 | * | 10/1985 | Pozniak | 701/108 |
| 4,999,781 | * | 3/1991 | Holl et al. | 701/108 |
| 5,205,260 | * | 4/1993 | Takahashi et al. | 73/118.2 |
| 5,303,168 | * | 4/1994 | Cullen et al. | 123/568.21 |
| 5,357,936 | * | 10/1994 | Hitomi et al. | 123/568.14 |
| 5,359,519 | * | 10/1994 | Jehanno | 701/103 |
| 5,515,833 | * | 5/1996 | Cullen et al. | 123/568.22 |
| 5,619,974 | * | 4/1997 | Rodefeld et al. | 123/568.23 |
| 5,758,308 | | 5/1998 | Maki et al. | |
| 5,845,627 | * | 12/1998 | Olin et al. | 701/108 |
| 5,934,249 | * | 8/1999 | Nanba et al. | 123/568.21 |
| 5,974,870 | * | 11/1999 | Treinies et al. | 73/118.2 |
| 6,109,249 | * | 8/2000 | Wild et al. | 123/568.21 |

FOREIGN PATENT DOCUMENTS

| 3903474 | 9/1989 | (DE) . |
|---|---|---|
| 4017547 | 12/1991 | (DE) . |
| 4222414 | 1/1993 | (DE) . |
| 4232044 | 4/1993 | (DE) . |
| 4333424 | 4/1994 | (DE) . |
| 196 12 739 | 10/1996 | (DE) . |
| 195 41 176 | 5/1997 | (DE) . |
| 2256727 | 12/1992 | (GB) . |
| 2294555 | 5/1996 | (GB) . |
| 4-175449 | 6/1992 | (JP) . |
| 06249030 | 9/1994 | (JP) . |
| 10115258 | 5/1998 | (JP) . |
| 10212979 | 8/1998 | (JP) . |
| WO 97/35106 | 9/1997 | (WO) . |

* cited by examiner

Primary Examiner—Andrew M. Dolinar
Assistant Examiner—Arnold Castro
(74) Attorney, Agent, or Firm—Walter Ottesen

(57) ABSTRACT

An internal combustion engine (1) has a throttle flap (9) via which the air is supplied to an intake manifold (7). An exhaust-gas recirculation (13, 14) is provided via which the exhaust gas is recirculated from an exhaust-gas pipe (8) to the intake manifold (7). A control apparatus is provided for open-loop and/or closed-loop controlling the engine. With the control apparatus, the gas mixture in the intake manifold (7) can be subdivided into a fresh gas component (rffgabg), an inert gas component (rffigabg) and a fuel gas component (rfhcabg).

17 Claims, 3 Drawing Sheets

METHOD FOR OPERATING AN INTERNAL COMBUSTION ENGINE

FIELD OF THE INVENTION

The invention relates to a method for operating an internal combustion engine such as the engine of a motor vehicle. In the engine, air is conducted to an intake manifold via a throttle flap and exhaust gas is fed back from the exhaust-gas pipe to the intake pipe via an exhaust-gas return. The invention also relates to an internal combustion engine and especially an engine for a motor vehicle having a throttle flap via which air can be supplied to an intake manifold. The engine also includes an exhaust-gas return via which the exhaust gas can be returned from an exhaust-gas pipe to the intake pipe and a control apparatus for open-loop or closed-loop control of the engine.

BACKGROUND OF THE INVENTION

The requirements imposed on a modern internal combustion engine become ever greater with the view of reducing the consumed fuel and the discharged exhaust gases and the toxic substances contained therein. This is the same as the objective of improving the combustion in the combustion chamber of the engine and especially to obtain the most complete combustion possible. To reduce the nitrogen oxide, the exhaust gas discharged from the combustion chamber is fed back into the intake manifold and therefore into the combustion chamber for further or renewed combustion.

This can be carried out by means of an external exhaust-gas return wherein a controllable exhaust-gas feedback valve is introduced into an exhaust-gas return line. With this feedback valve, the quantity of the exhaust gas to be fed back can be adjusted. Alternatively, or in addition, it is possible to provide an internal exhaust-gas return wherein an inlet valve of the engine is controlled in such a manner that it is opened at least for a short time duration during the discharge phase of the engine. During this time duration, the exhaust gas from the combustion chamber can reach the intake manifold and this defines an exhaust-gas feedback.

A further measure for improving the operation of the engine comprises precisely detecting the sequence of the combustion, which takes place in the combustion chamber of the engine, in order to be then able to consider the sequence especially as to the metering of fuel into the combustion chamber. One possibility to achieve this comprises forming a model of the engine and especially of the sequence of the combustion in the combustion chamber. As to a model, a type of engine observer is understood in this case. In this way, it can be achieved that the conditions present in the combustion chamber can be taken or derived from the model at each time point. The operating variables of the engine such as the fuel mass to be metered can be optimally determined and adjusted in dependence upon these conditions.

SUMMARY OF THE INVENTION

It is an object of the invention to improve the above-described method for operating an engine with the aid of a model.

The method of the invention is for operating an internal combustion engine such as an internal combustion engine for a motor vehicle, the engine having an intake manifold wherein an air/fuel mixture is formed and an exhaust-gas pipe. The method includes the steps of: supplying air via a throttle flap to the intake manifold; recirculating exhaust gas from the exhaust-gas pipe also to the intake manifold via an exhaust-gas return; and, splitting the air/fuel mixture in the intake manifold into a fresh-gas component (rffgabg), an inert-gas component (rfigabg) and a fuel-gas component (rfhcabg).

The invention is based on the recognition that the gas mixture, which is supplied to the combustion chamber, does not only comprise air but that this gas mixture has a fresh gas component, an inert gas component and a fuel gas component. The fresh gas is understood to be a gas which is necessary for a combustion, that is, oxygen for example. An inert gas is understood to be a gas which is not combustible such as carbon monoxide or carbon dioxide. A fuel gas is a gas such as fuel vapor.

The subdivision into the components of the gas mixture is applied for the gas mixture supplied to the intake manifold in the determination of a model of the engine. Accordingly, the gas mixture supplied to the intake manifold is subdivided into the above-mentioned fresh gas component, inert gas component and fuel gas component. The model of the combustion in the combustion chamber of the engine is then formed on the basis of this subdivision.

It is possible to provide a precise model of the charge in the intake manifold because of the subdivision of the gas mixture, which is supplied to the intake manifold, into the above-mentioned components. Inaccuracies in the formation of the model are thereby avoided. Likewise, it is possible to separately further process the individual components of the exhaust gas. In this way too, the precision is further increased. For example, the fresh gas component in the exhaust gas can be separately coupled with the fresh gas component of the air supplied via the throttle flap. In this way, inaccuracies are avoided which arise with a coupling of the supplied air with the total fed back exhaust gas.

With the aid of the model and especially with the aid of the model charge in the intake manifold of the engine, a conclusion can, inter alia, be drawn as to the sequence of the combustion in the combustion chamber. This opens the possibility to more precisely determine than heretofore the following: the fuel to be injected and/or the air flowing in via the throttle flap and/or the return rate of the exhaust gas. This, inter alia, has the consequence of a reduction of the generated exhaust gas and therefore of the discharged toxic substances.

In an advantageous further embodiment of the invention, the exhaust gas is fed back from the exhaust-gas pipe to the intake manifold via an external exhaust-gas return and the external exhaust-gas return is considered via a first dead time operating on each of the fresh gas component, the inert gas component and the fuel gas component. In an alternative or supplementary advantageous further embodiment of the invention, the exhaust gas from the exhaust-gas pipe is returned to the intake manifold via an internal exhaust-gas return and the internal exhaust-gas return is considered via a second dead time operating on each of the fresh gas component, the inert gas component and the fuel gas component. In this simple manner, it is possible to consider in the determined model the time duration, which the exhaust gas discharged by the combustion chamber needs to reach the intake manifold from the exhaust-gas pipe or from the combustion chamber.

In a further advantageous embodiment of the invention, the quantity of the exhaust gas, which is fed back via the external exhaust-gas return, is determined in dependence upon the control of an exhaust-gas return valve and/or the quantity of the exhaust gas, which is returned via the internal exhaust-gas return, is determined in dependence upon the control of an inlet valve. In this way, it is possible to compute for the model the quantity of the exhaust gas, which is returned via the external exhaust-gas return, from the control of the exhaust-gas return valve. Correspondingly, it is possible to draw a conclusion as to the quantity of the exhaust gas, which is fed back via the internal exhaust-gas return, from the control of the inlet valve.

In an advantageous embodiment of the invention, the regeneration gas from a tank-venting system is supplied to the intake manifold and the regeneration gas is broken down into a fresh gas component and a fuel gas component. The tank-venting system defines still another measure with which less toxic substances are outputted to the air while at the same time fuel should be saved. The fuel which vaporizes in the fuel tank at least to a certain extent is no longer outputted to the ambient; instead, it is trapped and supplied to the intake manifold and therefore to the combustion. According to the invention, this regeneration gas, which originates in the fuel tank, is subdivided into the above-mentioned components. As a difference with respect to the returned exhaust gas, the regeneration gas, however, does not contain an inert gas component but only a fresh gas component and a fuel gas component.

In an advantageous further embodiment of the invention, the fresh gas components of the external exhaust-gas return and the tank venting are added and the fuel gas components of the external exhaust-gas return and the tank venting are added. Accordingly, the corresponding components of the returned exhaust gas and of the regeneration gas are added. The above-mentioned components are considered separately in this manner, which, as mentioned, leads to an increased precision of the combustion model of the invention.

It is especially advantageous when the quantity of the exhaust gas, which is supplied via the tank venting, is determined in dependence upon the control of the tank-venting valve.

In an advantageous embodiment, the fresh gas component of the air, which is supplied via the throttle flap, is added to the fresh gas components of the external exhaust-gas return and, if required, the tank venting. According to the invention, the corresponding components of the returned exhaust gas and of the supplied air are added. The above-mentioned components are considered separately in this way which, as mentioned, leads to an increased precision of the combustion model of the invention.

In a further advantageous embodiment of the invention, the intake manifold is considered via a dead time operating on the fresh gas components, the inert gas components and the fuel gas components of the exhaust-gas recirculation and the air supplied to the throttle flap and, if required, the tank venting. In this way, it is possible to take into account the throughflow time through the intake manifold in the determined model.

In an advantageous embodiment of the invention, the fresh gas components, the inert gas components and the fuel gas components of the external exhaust-gas recirculation and of the air supplied via the throttle flap and, if required, of the tank venting and the fresh gas components, the inert gas components and the fuel gas components of the internal exhaust-gas recirculation are each added. According to the invention, the corresponding components of the recirculated exhaust gas and the supplied air are added. The above-mentioned components are considered separately in this manner and, as mentioned, this leads to a higher precision of the combustion model of the invention.

In an advantageous configuration of the invention, the fresh gas components, the inert gas components and the fuel gas components of the exhaust gas in the exhaust-gas pipe are determined with the aid of combustion equations from the fresh gas components, the inert gas components and the fuel gas components of the gas mixture in the intake manifold. Alternatively, or in addition, it is possible that the fresh gas components, the inert gas components and the fuel gas components of the exhaust gas in the exhaust-gas pipe are determined with the aid of sensors which are mounted especially in the exhaust-gas pipe. In this way, the connection from the gas mixture in the intake manifold via the combustion chamber of the engine to the exhaust gas in the exhaust-gas pipe is established.

Of special significance is the realization of the method of the invention in the form of a control element which is provided for a control apparatus of an internal combustion engine especially of a motor vehicle. A program is stored on the control element and can be run on a computer apparatus such as a microprocessor and is suitable for carrying out the method of the invention. In this case, the invention is realized by a program stored on the control element, so that this control element defines the invention in the same manner as the method for whose execution the program is suitable. An electric storage medium can be applied as a control element and the storage medium can, for example, be a read-only memory (ROM).

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
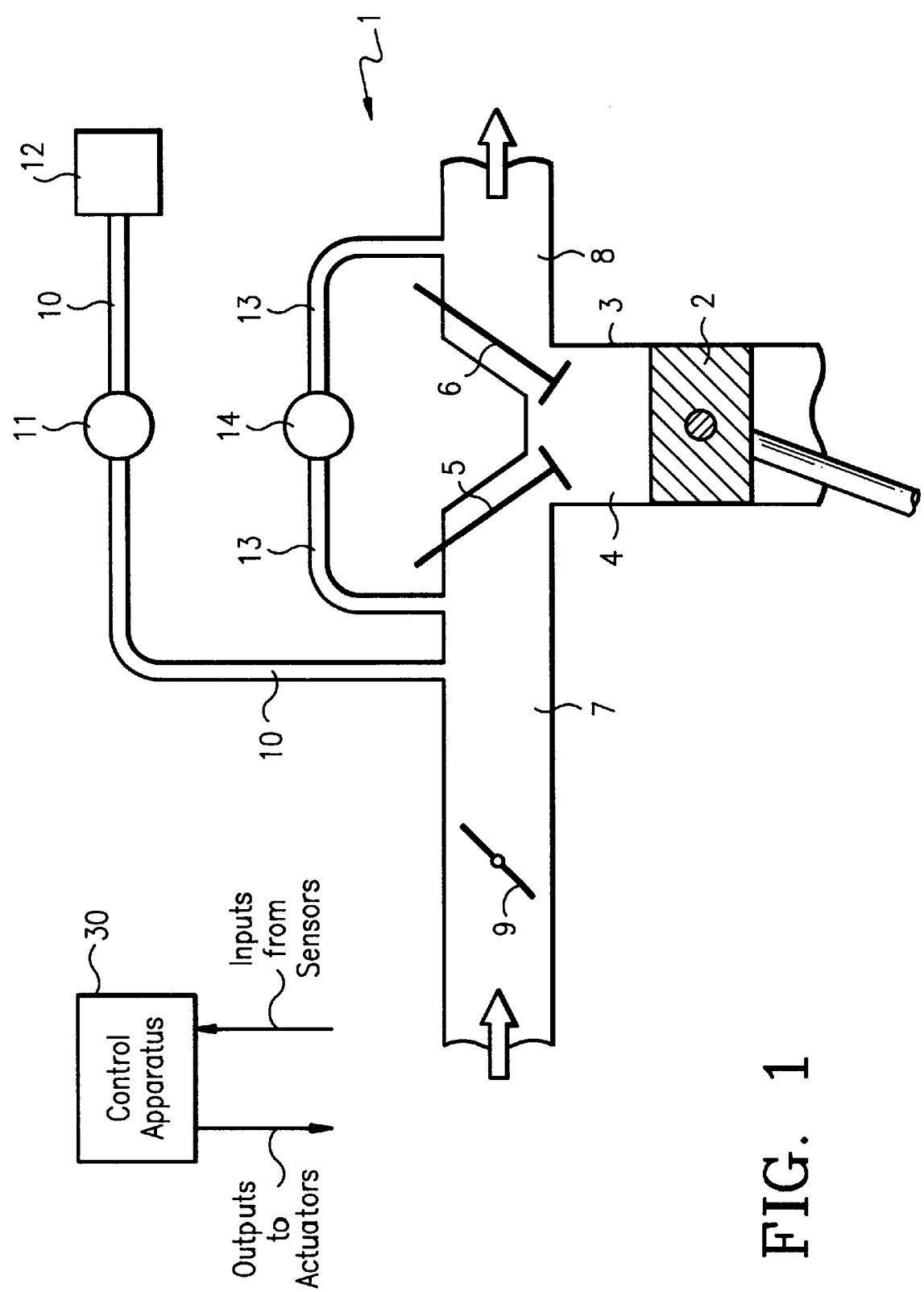
FIG. 1 is a schematic of an embodiment of an internal combustion engine of the invention.

In FIG. 1, an internal combustion engine 1 of a motor vehicle is shown, wherein a piston 2 is movable back and forth in a cylinder 3. The cylinder 3 defines a combustion chamber 4 which, inter alia, is delimited by the piston 2, an inlet valve 5 and an outlet valve 6. An intake manifold 7 is coupled by the intake valve 5 and an exhaust-gas pipe 8 is coupled by the outlet valve 6. Likewise, an injection valve and, if required, a spark plug are assigned to the combustion chamber 4.

A rotatable throttle flap 9 is accommodated in the intake manifold 7 and air can be supplied to the intake manifold 7 via the throttle flap. The quantity of supplied air is dependent upon the angular position of the throttle flap 9.

A tank-venting line 10 opens into the intake manifold 7 between the throttle flap 9 and the combustion chamber 4. The tank-venting line 10 is connected via a tank-venting valve 11 to an active charcoal filter 12. Regeneration gas, which vaporizes in a fuel tank of the motor vehicle and is collected in the active charcoal filter 12, can be supplied via the tank-venting line 10 to the intake manifold 7. The quantity of the supplied regeneration gas is dependent upon the position of the tank-venting valve 11.

An exhaust-gas recirculation line 13 leads from the exhaust-gas pipe 8 back to the intake manifold 7 where it opens into the intake manifold between the throttle flap 9 and the combustion chamber 4. Exhaust gas can be fed back into the intake manifold 7 via the exhaust-gas recirculation line 12. An exhaust-gas return valve 14 is provided in the exhaust-gas return line 13 and the quantity of the recirculated exhaust gas is dependent upon the position of this valve 14.

Reference numeral 30 identifies a control apparatus for controlling the engine so as to divide the gas mixture in the intake manifold 7 into a fresh-gas component (rffgabg), an inert-gas component (rfigabg) and a fuel-gas component (rfhcabg). The control apparatus includes a control element on which a program can be stored and run on a computer apparatus such as a microprocessor. The program is suitable for carrying out the method of the invention.

With respect to FIG. 2, it will now be explained how the number of molecules flowing into and out of the intake manifold 7 can be determined by means of a model. This number can then be further used in the illustration of the model of FIG. 3.

Figure 2:
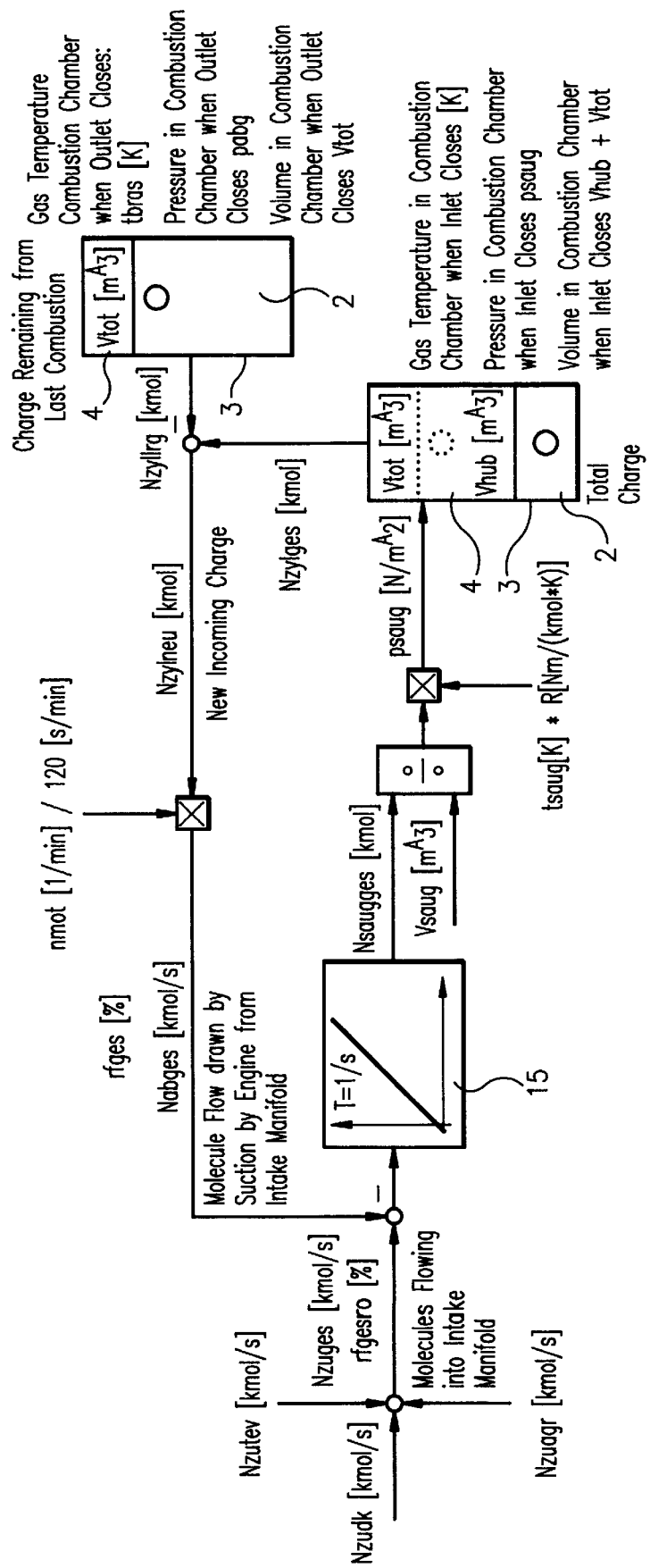
FIG. 2 is a schematic block diagram of a model for determining the number of molecules flowing into and out of the intake manifold of the engine of FIG. 1; and, FIG. 3 is a further schematic block circuit diagram of the model of FIG. 2 for splitting the component flows into fresh gas, inert gas and fuel gas.

The designations used in FIG. 2 are explained in Appendix 1. The equations corresponding to FIG. 2 are given in Appendix 2.

The molecule number Nzylneu is taken from the intake manifold 7 in a stroke of the piston 2 into the cylinder 3 during the induction phase of the engine 1. This results from the subtraction of the molecule number Nzylrg from the molecule number Nzylges.

The molecule number Nzylges is that molecule number which the piston 2 can draw in by suction from the intake manifold 7 because of the maximum available volume of the combustion chamber 4. The maximum available volume of the combustion chamber 4 is dependent upon the stroke volume Vhub of the piston 2 and the dead volume Vtot which the combustion chamber 4 has. The molecule number Nzylges can be computed with the general gas equation wherein the temperature tbras in the combustion chamber 4 is to be considered for a closing inlet valve 5 and the pressure psaug in the intake manifold 7.

The molecule number Nzylrg is that molecule number which remains as dead volume in the combustion chamber 4 and is therefore not inducted by the piston 2 from the intake manifold 7 because this molecule number, as mentioned, is still available from the last combustion in the combustion chamber 4 of the cylinder 3. The last-mentioned molecule number Nzylrg is dependent upon the dead volume Vtot which the combustion chamber 4 exhibits. The molecule number Nzylrg can be computed with the general gas equation wherein the temperature pbras in the combustion chamber 4 is to be considered for closing exhaust-gas valve 6 and the pressure pabg in the exhaust-gas pipe 8.

The molecule number Nzylneu taken from the intake manifold 7 is thereafter converted into a molecule flow Nabges, that is, into a molecule flow per unit of time. For this purpose, the molecule number Nzylneu is multiplied by the rpm nmot of the engine 1. The engine 1 is a four-stroke engine and a four-stroke engine has only one intake phase for each two rotations. For this reason, the multiplicative constant K is provided. At the same time, a conversion of minutes into seconds is carried out with the constant K.

The molecule flow Nabges can be converted into the total relative charge rfges, which flows out from the intake manifold 7 to the combustion chamber 4.

The flow of molecules from the intake manifold 7 to the combustion chamber 4 causes a simultaneous inflow of molecules into the intake manifold 7. Here, it is the molecule flow Nzuges.

The molecule flow Nzuges can be converted into the total relative charge rfgesro which flows into the intake manifold 7.

The molecule flow Nzuges is composed of the molecule flows Nzudk, Nzutev and Nzuagr. The molecule flow Nzudk comprises air and flows to the intake manifold 7 via the throttle flap 9. The molecule flow Nzutev comprises regeneration gas and flows to the intake manifold 7 via the tank-venting line 10. The molecule flow Nzuagr comprises exhaust gas and flows to the intake manifold 7 via the exhaust-gas return line 13.

The molecule flow Nabges, which flows from the intake manifold 7, is subtracted from the molecule flow Nzuges which flows into the intake manifold 7. The result is supplied to an integrator 15 which models the storage performance of the intake manifold 7. The integrator 15 generates a molecule number Nsaugges from the molecule flow supplied to the integrator, that is, from the supplied molecule number per unit of time. This molecule number Nsaugges is that molecule number which is located in the intake manifold 7 at the particular time point.

The pressure psaug in the intake manifold 7 can be determined with the general gas equation from the molecule number Nsaugges. For this purpose, the volume Vsaug of the intake manifold 7 and the temperature tsaug of the gases in the intake manifold 7 are considered.

The molecule number Nzylges is determined from the pressure psaug in the intake manifold 7 and the molecule Nzylneu can be determined from this molecule number Nzylges. This proceeds from the description of FIG. 2 presented above.

Figure 3:
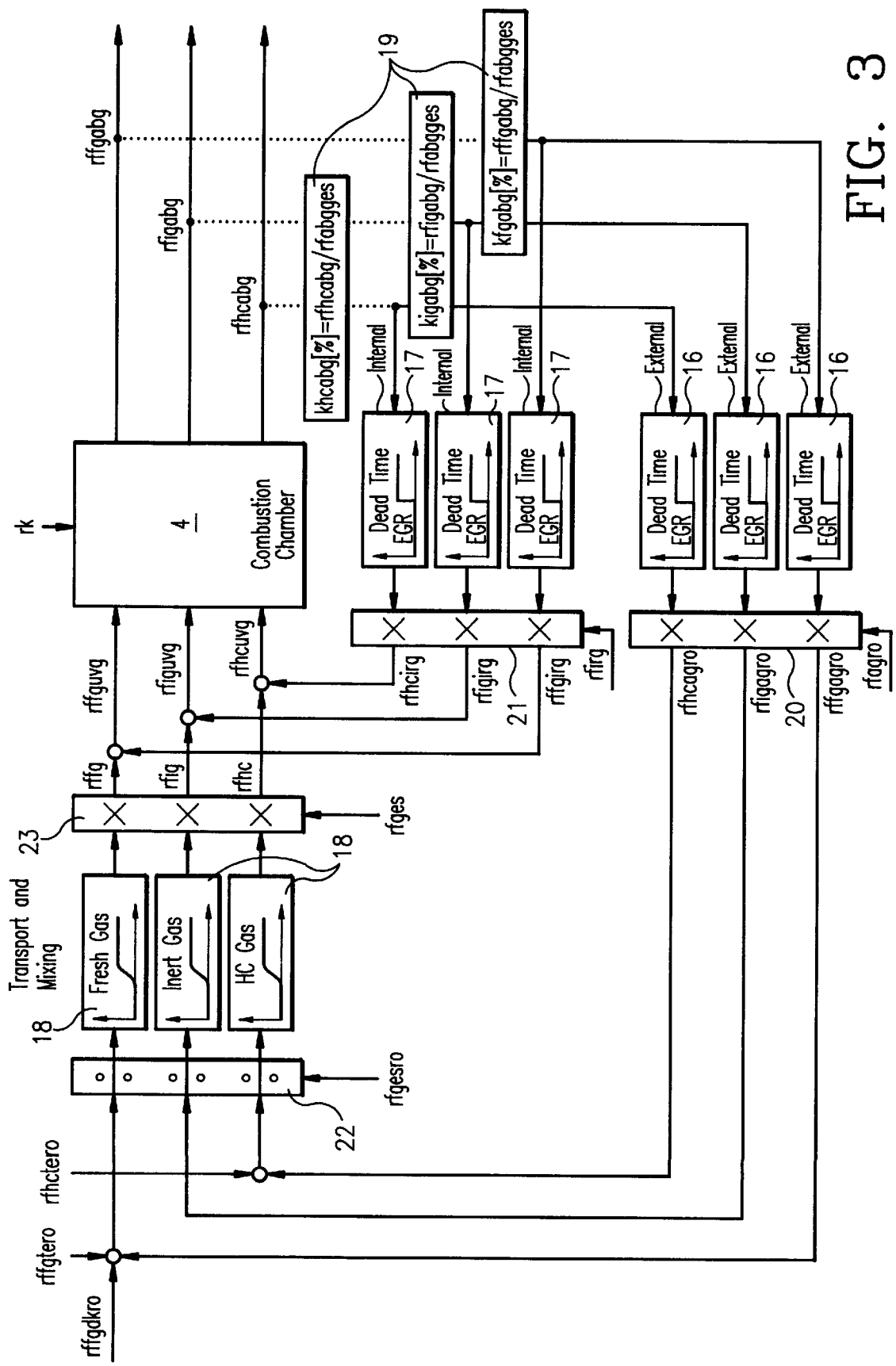

In FIG. 3, the model of FIG. 2 is shown especially with the view to the combustion of an air/fuel mixture in the combustion chamber 4 of the engine 1.

The designations used in FIG. 3 are presented in Appendix 3. The equations which correspond to FIG. 3 are given in Appendix 4.

For each exhaust phase of the engine 1, the exhaust gas rfabgges is discharged from the combustion chamber 4 into the exhaust-gas pipe 8. This exhaust gas rfabgges is composed of the fresh gas component rffgabg, the inert gas component rfigabg and the fuel gas component rfhcabg. The fresh gas component rffgabg is a gas which is necessary for a combustion, that is, for example, oxygen. The inert gas component rfigabg is a gas which is not combustible, for example, carbon monoxide or carbon dioxide. The fuel gas component rfhcabg is a gas which comprises, for example, fuel vapor.

The fresh gas component rffgabg, the inert gas is component rfigabg and the fuel gas component rfhcabg are relative charges which, when divided by the total discharged exhaust gas rfabgges, are converted into the corresponding concentrations kfgabg, kigabg and khcabg. This is shown in the blocks 19.

The above-mentioned concentrations kfgabg, kigabg and khcabg are each supplied to a dead-time element 16 with which the time duration is modeled which the exhaust gas needs in order to reach the intake manifold 7 from the exhaust-gas pipe 8 via the exhaust-gas return line 13. With the aid of the dead-time elements 16, the exhaust-gas return via the exhaust-gas return line 13 and the exhaust-gas return line 14 is considered. This defines an external exhaust-gas recirculation.

The quantity of the exhaust gas rfagro, which is returned via the exhaust-gas return line 13 can be determined in dependence upon the position of the exhaust-gas return valve 14. By multiplying the time-delayed concentrations kfgabg, kigabg and khcabg with the returned exhaust gas rfagro, the corresponding relative charges again result. This is shown in block 20, with which the components rffgagro, rfigagro, rfhcagro which are returned via the external exhaust-gas return, are determined. These components are the fresh gas component rffgagro, inert gas component rfigagro and fuel gas component rfhcagro which are returned to the intake manifold 7.

The concentrations kfgabg, kigabg and khcabg are likewise supplied to respective dead-time elements 17 with which the time duration between two sequential combustions of the same cylinder 3 is modeled.

As explained with reference to FIG. 2, for each combustion, a dead volume with exhaust gas remains in the combustion chamber 4 of the engine 1. This dead volume must again be considered with the next combustion. This is achieved with the return via the dead-time elements 17 and is identified as internal exhaust-gas recirculation.

In addition to the remaining dead volume, a return of the exhaust gas of this kind from the combustion chamber 4 into the intake manifold 7 can be amplified in that the inlet valve 5 is opened during the discharge phase of the engine 1 at least for a certain time duration. During this time duration, exhaust gas is discharged directly from the combustion chamber 4 back into the intake manifold 7. This exhaust-gas recirculation is an expanded internal exhaust recirculation which likewise must be considered with the next combustion. This, in turn, is achieved with the aid of the dead-time elements 17.

The quantity of the exhaust gas rfirg, which is directly recirculated, can be determined in dependence upon the dead volume of the combustion chamber 4 of the engine 1 and, if required, from the control of the inlet valve 5. With the aid of this value, the components rffgirg, rfigirg, rfhcirg, which are recirculated via the internal exhaust-gas recirculation, can then be determined multiplicatively by means of the block 21 from the time-delayed concentrations kfgabg, kigabg and khcabg. These components are: fresh gas component rffgirg, inert gas component rfigirg and fuel gas component rfhcirg which are recirculated to the intake manifold 7.

The regeneration gas rftero, which is supplied via the tank-venting line 10 to the intake manifold 7 is composed of a fresh gas component rffgtero and a fuel gas component rfhctero. The total quantity of the regeneration gas rftero can be determined via the position of the tank-venting valve 11. In dependence upon the concentration of the regeneration gas rftero, a conclusion can be drawn as to the percentage of the fresh gas component rffgtero and of the fuel gas component rfhctero.

The air, which is supplied to the intake manifold 7 via the throttle flap 9, has a specific fresh gas component rffgdk which, inter alia, is dependent upon the air pressure which is present.

This last-mentioned fresh gas component rffgdk, the fresh gas component rffgtero of the regeneration gas and the fresh gas component rffgagro of the external exhaust-gas recirculation are added. The result is supplied to a block 22.

The inert gas component rfigagro of the external exhaust-gas recirculation is likewise supplied to block 22.

The fuel gas component rfhctero of the regeneration gas and the fuel gas component rfhcagro of the external exhaust-gas recirculation are added and then supplied to block 22.

As has been explained with respect to FIG. 2, the total relative charge rfgesro, which flows into the intake manifold 7, can be determined from the molecule flow Nzuges. By dividing by this total relative charge rfgesro, the relative charges, which are supplied to block 22 and are partially determined by addition, are converted into concentrations.

The concentrations which result are time delayed with the aid of dead-time elements 18. In this way, the transport of the gas mixture into the intake manifold 7 is modeled. The dead-time elements 18 can, in addition, be provided with a lowpass with which the mixing can be modeled during the throughflow of the gas mixture through the intake manifold 7 of the engine 1. The dead-time elements 18 relate to the fresh gas, the inert gas and the fuel gas which, together, define the gas mixture in the intake manifold 7 of the engine 1.

As has been explained with reference to FIG. 2, the total relative charge rfges, which flows out from the intake manifold 7, can be determined from the molecule flow Nabges. By multiplying by this total relative charge rfges in a block 23, the concentrations, which are time-delayed by the dead-time elements 18, can again be converted into relative charges, that is, into the relative charge rffg for the fresh gas, into the relative charge rfig for the inert gas and into the relative charge rfhc for the fuel gas.

The external exhaust-gas recirculation via the exhaust-gas return line 13 is connected to the intake manifold 7 in accordance with FIG. 1. For this reason, the components, which belong to the external exhaust-gas recirculation, are coupled in forward of the dead-time elements 18 which model the intake manifold 7. In contrast thereto, the internal exhaust-gas return takes place directly in the combustion chamber 4 or, if required, from the combustion chamber 4 into the intake manifold 7. For this reason, the components, which belong to the internal exhaust-gas return, are coupled in after the dead-time elements 18 which model the intake manifold 7.

The fresh gas component rffg and the fresh gas component rffgirg of the internal exhaust-gas recirculation are added. The resulting fresh gas component rffguvg is the fresh gas which is supplied to the combustion chamber 4. The inert gas component rfig and the inert gas component rfigirg of the internal exhaust-gas return are added. The resulting inert gas component rfiguvg is the inert gas which is supplied to the internal combustion chamber 4. The fuel gas component rfhc and the fuel gas component rfhcirg of the internal exhaust-gas recirculation are added. The resulting fuel gas component rfhcuvg defines the fuel gas which is supplied to the combustion chamber 4.

A relative fuel mass rk is injected into the combustion chamber 4. This fuel mass rk as well as the fresh gas component rffguvg, the inert gas component rfiguvg and the fuel gas component rfhcuvg are ignited in the combustion chamber 4 by means of a spark plug and combusted. From this combustion, the exhaust gas again results having the fresh gas component rffgabg, the inert gas component rfigabg and the fuel gas component rfhcabg from which the initial description of FIG. 3 proceeded.

The exhaust gas in the exhaust-gas pipe 8 comprises the fresh gas component rffgabg, the inert gas component rfigabg and the fuel gas component rfhcabg and can be determined with the aid of the following combustion equations from the gas mixture supplied via the intake manifold 7 to the combustion chamber 4. The gas mixture comprises the fresh gas component rffguvg, the inert gas component rfiguvg and the fuel gas component rfhcuvg.

For fresh gas, the following applies:

$$\text{rffgabg} = \text{rffguvg} - <\text{rk}*\eta_{vb}*\text{rfhcuvg}*30>$$

wherein $<rk^* \eta_{vb} *rfhcuvg*30>$ can have a maximum value equal to rffguvg and wherein $\eta_{vb}$ is that component of the relative charge of the fuel gas rfhcuvg which is supplied to the combustion chamber 4 and which is actually combusted in the combustion chamber 4.

This component results in that not necessarily the entire fuel gas rfhcuvg, which is supplied to the combustion chamber as a homogeneous charge, is reached by the ignition flame and is therefore not combusted especially for a direct injection of the relative fuel mass rk into the combustion chamber 4 and a stratified charge which results therefrom.

The factor 30 results from the stoichiometric ratio of fresh gas to fuel gas. Referred to butane, the mass ratio is 1:15 and the density ratio is 1:2.

The expression within the arrow-shaped brackets <> in the above equation is subtracted from the fresh gas rffguvg supplied to the combustion chamber 4 because, for the combustion, the supplied fuel mass rk and the supplied fuel gas are converted and thereby are taken away from the supplied fresh gas.

For the inert gas, the following applies:

$$rfigabg = rfiguvg + <rk^*\eta_{vb}*rfhcuvg*30>$$

wherein $(rk^*\eta_{vb}*rfhcuvg*30)$ can have a maximum value of rfiguvg.

In this case, the expression within the arrow-shaped brackets <> is added to the inert gas rfiguvg, which is supplied to the combustion chamber 4, because, for the combustion, the added fuel mass rk and the supplied combustion gas is converted while forming the exhaust gas and therefore more inert gas is formed.

For the fuel gas, the following applies:

$$rfhcabg = rfhcuvg^*(1-\eta_{vb}) + <(rk+\eta_{vb}*rfhcuvg*30) - (rffguvg/30)>$$

wherein the material within the arrow-shaped brackets <> has a minimum value of zero.

The fuel gas rfhcabg is, on the one hand, reduced by the component actually combusted in the combustion chamber. On the other hand, the quantity within the arrow-shaped brackets <> is subjected to a correction which is required especially for a rich mixture.

In total, in this way, the components (fresh gas component rffgabg, inert gas component rfigabg and fuel gas component rfhcabg) contained in the exhaust-gas pipe 8 are determined with the combustion equations.

Alternatively, or in addition, it is possible to determine the above-mentioned components (fresh gas component rffgabg, inert gas component rfigabg, fuel gas component rfhcabg) which are contained in the exhaust-gas pipe 8 with the aid of sensors which are mounted in the exhaust-gas pipe 8.

It is understood that the foregoing description is that of the preferred embodiments of the invention and that various changes and modifications may be made thereto without departing from the spirit and scope of the invention as defined in the appended claims.

| Appendix 1 | | |
|---|---|---|
| Nzylneu | = | molecule number taken from the intake manifold 7 for a stroke of the cylinder 3, unit: kmol |
| Nzylirg | = | molecule number still present in cylinder 3 from the last combustion, unit: kmol |
| Nzylges | = | molecule number which can be inducted by cylinder 3 in total for a stroke, unit: kmol |
| Vtot | = | dead volume of the cylinder 3, unit: m³ |
| Vhub | = | stroke volume of the cylinder 3, unit: m³ |
| psaug | = | pressure in the intake manifold 7 for a closed inlet valve 5, unit: N/m² |
| tsaug | = | temperature in the intake manifold 7 for closed inlet valve 5, unit: K |
| Vsaug | = | volume of the intake manifold 7, unit: m³ |
| Nsaugges | = | molecule number contained in the intake manifold 7, unit: kmol |
| Nzuges | = | molecule number flowing to the intake manifold 7 per unit of time, unit: kmol/s |
| Nabges | = | molecule number drawn by suction from the intake manifold 7 per unit of time, unit: kmol/s |
| Nzutev | = | molecule number flowing in via tank-venting valve 11 per unit of time, unit: kmol/s |
| Nzudk | = | molecule number flowing in via the throttle flap 9 per unit of time, unit: kmol/s |
| Nzuagr | = | molecule number flowing in via exhaust-gas regeneration valve 14 per unit of time, unit: kmol/s |
| nmot | = | rpm of the engine 1, unit: 1/min |
| rfges | = | total relative charge from the intake manifold 7, unit: % |
| rfgesro | = | total relative charge in the intake manifold 7, unit: % |
| tbres | = | temperature in the combustion chamber 4 for a closing inlet valve 5, unit: K |
| tbras | = | temperature in the combustion chamber 4 for a closed outlet valve 5, unit: K |
| pabg | = | pressure in the exhaust-gas pipe 8, unit: N/m² |
| T | = | time, unit: seconds |
| R | = | gas constant: 8314 Nm/kmol*K |
| K | = | constant: 120 sec/min |

| Appendix 2 | | |
|---|---|---|
| Nzylneu | = | Nzylges − Nzylirg |
| Nzylges | = | (psaug * (Vtot + Vhub)) / ® * tbres) |
| Nzylirg | = | (pabg * Vtot) / ® * tbras) |
| Nabges | = | (Nzylneu * nmot) / K |
| Nsaugges | = | (Nzuges − Nabges) * T |
| psaug | = | (Nsaugges * tsaug * R) / Vsaug |
| Nzuges | = | Nzutev + Nzudk + Nzuagr |

| Appendix 3 | | |
|---|---|---|
| rftero | = | total relative charge, from tank venting to the intake manifold |
| rffgtero | = | relative charge, fresh gas, from tank venting to the intake manifold |
| rfhctero | = | relative charge, fuel gas from tank venting to intake manifold |
| rffgdkro | = | relative charge, fresh gas, from throttle flap to intake manifold |
| rfagro | = | total relative charge from external EGR to intake manifold |
| rffgagro | = | relative charge, fresh gas, from external EGR to intake manifold |
| rfigagro | = | relative charge, inert gas, from external EGR to intake manifold |
| rfhcagro | = | relative charge, fuel gas, from external EGR to intake manifold |
| rfabgges | = | total relative charge, exhaust gas |
| rffgabg | = | relative charge, fresh gas in the exhaust gas |
| rfigabg | = | relative charge, inert gas in the exhaust gas |
| rfhcabg | = | relative charge, fuel gas in the exhaust gas |

-continued

Appendix 3

| | | |
|---|---|---|
| kfgabg | = | concentration fresh gas in the exhaust gas |
| kigabg | = | concentration inert gas in the exhaust gas |
| khcabg | = | concentration fuel gas in the exhaust gas |
| rffg | = | relative charge, fresh gas |
| rfig | = | relative charge, inert gas |
| rfhc | = | relative charge, fuel gas |
| rffgirg | = | relative charge, fresh gas, from internal EGR |
| rfigirg | = | relative charge, inert gas from internal EGR |
| rfhcirg | = | relative charge, fuel gas from internal EGR |
| rfirg | = | total relative charge from internal EGR |
| rffguvg | = | relative charge, fresh gas to the combustion chamber |
| rfiguvg | = | relative charge, inert gas to the combustion chamber |
| rfhcuvg | = | relative charge, fuel gas to the combustion chamber |
| rk | = | relative fuel mass |

Appendix 4

| | | |
|---|---|---|
| rfgesro | = | rffgtero + rffgdkro * rffgagro + rfigagro + rfhctero + rfhcagro |
| rfges | = | rffg + rfig + rfhc |
| rftero | = | rffgtero + rfhctero |
| rffguvg | = | rffg + rffgirg |
| rfiguvg | = | rfig + rfigirg |
| rfhcuvg | = | rfhc + rfhcirg |
| rfirg | = | rffgirg + rfigirg + rfhcirg |
| rfabgges | = | rffgabg + rfigabg + rfhcabg |
| kfgabg | = | rffgabg / rfabgges |
| kigabg | = | rfigabg / rfabgges |
| khcabg | = | rfhcabg / rfabgges |
| rfagro | = | rffgagro + rfigagro + rfhcagro |

What is claimed is:

1. A method for operating an internal combustion engine including an internal combustion engine for a motor vehicle, the engine having an intake manifold wherein an air/fuel mixture is formed and an exhaust-gas pipe, the method comprising the steps of:

supplying air via a throttle flap to said intake manifold;

recirculating exhaust gas from said exhaust-gas pipe also to said intake manifold via an exhaust-gas recirculation;

dividing said air/fuel mixture in said intake manifold into a fresh-gas component (rffgabg), an inert-gas component (rfigabg) and a fuel-gas component (rfhcabg) for the purpose of modeling said engine; and, determining a fresh-gas component, an inert-gas component and a fuel-gas component of the exhaust gas in said exhaust-gas pipe from said fresh-gas component, said inert-gas component and said fuel-gas component of said air/fuel mixture in said intake manifold with the aid of combustion equations.

2. The method of claim 1, comprising the further steps of:

recirculating the exhaust gas from said exhaust-gas pipe via an external exhaust-gas recirculation to the intake manifold; and, considering the external exhaust-gas recirculation with dead-time elements operating respectively on the fresh-gas component (rffgabg), the inert-gas component (rfigabg) and the fuel-gas component (rfhcabg).

3. The method of claim 1, comprising the further steps of:

recirculating the exhaust gas from said exhaust-gas pipe via an internal exhaust-gas recirculation to said intake manifold; and, considering the internal exhaust-gas recirculation with with dead-time elements operating respectively on the fresh-gas component (rffgabg), the inert-gas component (rfigabg) and the fuel-gas component (rfhcabg).

4. The method of claim 3, wherein said engine includes an inlet valve communicating with said intake manifold; and, said method comprising the further step of:

determining the quantity of the exhaust gas, which is recirculated via the internal exhaust-gas recirculation, in dependence upon the control of said inlet valve.

5. The method of claim 1, wherein said engine includes a tank-venting system; and, said method comprising the further steps of:

supplying regeneration gas from said tank-venting system to said intake manifold; and, dividing said regeneration gas into a fresh-gas component (rffgtero) and a fuel-gas component (rfhctero) for the purpose of modeling the engine.

6. The method of claim 5, comprising the further steps of:

adding the fresh-gas component of the external exhaust-gas recirculation (rffgagro) and the fresh-gas component (rffgtero) of said regeneration gas; and, adding the fuel-gas component (rfhccagro) of the external exhaust-gas recirculation and the fuel-gas component (rfhctero) of the regeneration gas.

7. The method of claim 6, wherein said tank-venting system includes a tank-venting valve; and, said method comprising the further step of determining the quantity of the regeneration gas, which is supplied via the tank-venting system, in dependence upon the control of said tank-venting valve.

8. The method of claim 7, comprising the further step of adding the fresh gas component (rffgdkro) of the air, which is supplied via said throttle flap, to at least one of the following: the fresh-gas component (rffgagro) of the external exhaust-gas recirculation and the fresh-gas component (rffgtero) of the regeneration gas.

9. The method of claim 1, comprising the further step of considering said intake manifold with:

dead-time elements operating respectively on the fresh-gas component, the inert-gas component, the fuel-gas component of the exhaust-gas recirculation; and, dead-time elements operating respectively on the fresh-gas component of the air, which is supplied via the throttle flap.

10. The method of claim 9, comprising the further step of also considering said intake manifold with dead-time elements operating respectively on the fresh-gas component and fuel-gas component of the regeneration gas of the tank-venting system.

11. The method of claim 1, wherein said engine includes a tank-venting system and a throttle flap; and, said method comprising the further steps of:

adding the fresh-gas component of the external exhaust-gas recirculation to at least one of the following: the fresh-gas component of the air supplied via said throttle flap; the fresh-gas component of the regeneration gas of the tank-venting system; and, the fresh-gas component of the internal recirculation;

adding the inert-gas component of the external exhaust-gas recirculation to the inert-gas component of the internal recirculation; and, adding the fuel-gas component of the external exhaust-gas recirculation to at least one of the following: the fuel-gas component of the regeneration gas of the tank-venting system; and, the fuel-gas component of the internal exhaust-gas recirculation.

12. The method of claim 2, wherein said engine includes an exhaust-gas recirculation valve communicating with said exhaust-gas pipe and said intake manifold; and, said method comprising the further step of determining the quantity of the exhaust gas, which is recirculated via the external exhaust-gas recirculation, in dependence upon the control of said exhaust-gas recirculation valve.

13. The method of claim 1, comprising the further step of determining the fresh-gas component, the inert-gas component and the fuel-gas component of the exhaust gas in said exhaust-gas pipe with the aid of sensors mounted in said exhaust-gas pipe.

14. A control element such as a read-only-memory for a control apparatus for an internal combustion engine including an internal combustion engine for a motor vehicle, the control element comprising a program stored in said control element which can be run on a microprocessor to perform the method steps of:

supplying air via a throttle flap to said intake manifold;

recirculating exhaust gas from said exhaust-gas pipe also to said intake manifold; and, dividing said air/fuel mixture in said intake manifold into a fresh-gas component (rffgabg), an inert-gas component (rfigabg) and a fuel gas component (rfhcabg) for the purpose of modeling said engine; and, determining a fresh-gas component, an inert-gas component and a fuel-gas component of the exhaust gas in said exhaust-gas pipe from said fresh-gas component, said inert-gas component and said fuel-gas component of said air/fuel mixture in said intake manifold with the aid of combustion equations.

15. An internal combustion engine including an internal combustion engine for a motor vehicle, said engine comprising:

an intake manifold through which a gas mixture flows to said engine;

a throttle flap via which air is supplied to said intake manifold;

an exhaust-gas pipe;

a return for recirculating exhaust gas from said exhaust-gas pipe; and, a control apparatus for controlling said engine so as to divide said gas mixture in said intake manifold into a fresh-gas component (rffgabg), an inert-gas component (rfigabg) and a fuel-gas component (rfhcabg) for the purpose of modeling said engine; and, said control apparatus including means for determining a fresh-gas component, an inert-gas component and a fuel-gas component of the exhaust gas in said exhaust-gas pipe from said fresh-gas component, said inert-gas component and said fuel-gas component of said air/fuel mixture in said intake manifold with the aid of combustion equations.

16. The internal combustion engine of claim 15, wherein said control is an open-loop control.

17. The internal combustion engine of claim 15, wherein said control is a closed-loop control.

* * * * *